United States Patent

Hong

[15] 3,693,152

[45] Sept. 19, 1972

[54] ERROR DETECTION CIRCUIT FOR DECODERS

[72] Inventor: Se J. Hong, Poughkeepsie, N.Y.

[73] Assignee: International Business Machines Corporation, Armonk, N.Y.

[22] Filed: Dec. 21, 1970

[21] Appl. No.: 99,877

[52] U.S. Cl. ..........................340/146.1 AG, 235/153

[51] Int. Cl. ..........................................H03k 13/34

[58] Field of Search...........340/146.1 AB, 146.1 AG; 235/153; 307/216

[56] References Cited

UNITED STATES PATENTS 3,428,945 2/1969 Toy ........................340/146.1
3,541,507 11/1970 Duke ......................340/146.1

OTHER PUBLICATIONS

Sellers, et al., Error Detecting Logic for Digital Computers, McGraw–Hill, 1968, pp. 212–217.

*Primary Examiner*—Charles E. Atkinson
*Attorney*—Hanifin and Jancin and Harold H. Sweeney, Jr.

[57] ABSTRACT

A decoder error detection circuit having a first and second OR circuit. The first OR circuit having as inputs thereto the half of the outputs from the decoder which represent binary numbers having the same parity. The inputs to the second OR circuit are obtained from the other half of the decoder outputs which represent binary numbers of the opposite parity of those in the first half. The output of the first and second OR circuits is connected to a logic circuit consisting of a NOR circuit and an AND circuit connected to each of said first and second OR circuits in parallel. The outputs of the NOR and AND circuits are OR'ed together to provide an error indication for any single hardware failure in the decoder being checked.

4 Claims, 2 Drawing Figures

| | $2^2$ | $2^1$ | $2^0$ | |
|---|---|---|---|---|
| $F_0$ | 0 | 0 | 0 | EVEN |
| $F_1$ | 0 | 0 | 1 | ODD |
| $F_2$ | 0 | 1 | 0 | ODD |
| $F_3$ | 0 | 1 | 1 | EVEN |
| $F_4$ | 1 | 0 | 0 | ODD |
| $F_5$ | 1 | 0 | 1 | EVEN |
| $F_6$ | 1 | 1 | 0 | EVEN |
| $F_7$ | 1 | 1 | 1 | ODD |

PATENTED SEP 19 1972

3,693,152

| | $2^2$ | $2^1$ | $2^0$ | |
|---|---|---|---|---|
| $F_0$ | 0 | 0 | 0 | EVEN |
| $F_1$ | 0 | 0 | 1 | ODD |
| $F_2$ | 0 | 1 | 0 | ODD |
| $F_3$ | 0 | 1 | 1 | EVEN |
| $F_4$ | 1 | 0 | 0 | ODD |
| $F_5$ | 1 | 0 | 1 | EVEN |
| $F_6$ | 1 | 1 | 0 | EVEN |
| $F_7$ | 1 | 1 | 1 | ODD |

INVENTORS
SE J. HONG

BY [signature]
ATTORNEY

ERROR DETECTION CIRCUIT FOR DECODERS

The invention relates to a detection circuit and more particularly, to a detection circuit capable of responding to any single hardware failure in a decoder of the type having $n$ inputs and $2^n$ outputs.

There are a number of arrangements for detecting errors caused by single hardware failure in decoders. The decoders being checked are of the type which have $n$ inputs and $2^n$ outputs. The one output selected depends on the input combination. Various checking circuits for detecting single hardware failure in such decoders are shown in chapter 12.3, page 212 of the book entitled, Error Detecting Logic For Digital Computers by Sellers, Hsia and Bearnson, McGraw-Hill Book Company, 1968. It should be observed from these examples of checking circuits that complete detection of any single hardware failure requires considerable redundancy of circuitry. As the decoder increases in size, the redundancy approach to detecting errors becomes impractical. Accordingly, in FIG. 12–4 of the above-noted reference, the redundancy approach is eliminated by connecting half of the outputs of the decoder to one circuit and half to another thus dividing the output lines into two groups. Checking through the logic, it will be appreciated that the absence of an output from the decoder or the detecting of an output in both groups, will give rise to an error signal. Such an arrangement cuts down on the redundancy of circuitry generally required for performing the detection but it also cuts the detecting capability of the circuit in half since the circuitry is incapable of detecting failures which cause two or more outputs to be energized in the same group.

It is an object of the present invention to provide an error detecting circuit for a decoder which uses minimum circuitry for detecting all single hardware failures in the decoder.

It is another object of the present invention to provide an error checking circuit for a decoder which is adaptable to any size decoder.

Briefly, the invention consists of a detection circuit for errors caused by a single hardware failure in a decoder of the type having $n$ inputs and $2^n$ outputs. A first circuit of the detector has $2^n/2$ inputs and 1 output where each input is connected to a respective one of the outputs of the decoder representing a binary number having the same parity. A second circuit of the detector has the other half of the outputs from the decoder connected thereto as inputs. Each of these outputs represents binary numbers having the same parity but opposite to the parity of the binary numbers represented by the other half of the outputs from the decoder. The first and second circuits produce an output signal when one or more inputs thereto are energized, respectively. An output signal at an output of either of said first and second circuits represents an error-free operation of the decoder while the absence of any output signal from both the first and second circuits represents one type of failure in the decoder. The presence of an output signal on an output line of both of said first and second circuits represents another type of failure in the decoder. The connecting of the outputs of the decoder representing opposite parities, to inputs of the first and second circuits respectively, insure that said another type of failure in the decoder causes an output signal from both of the first and second circuits.

The foregoing and other objects, features and advantages of the invention will be apparent from the following more particular description of a preferred embodiment of the invention, as illustrated in the accompanying drawings.

Figures 1, 2:
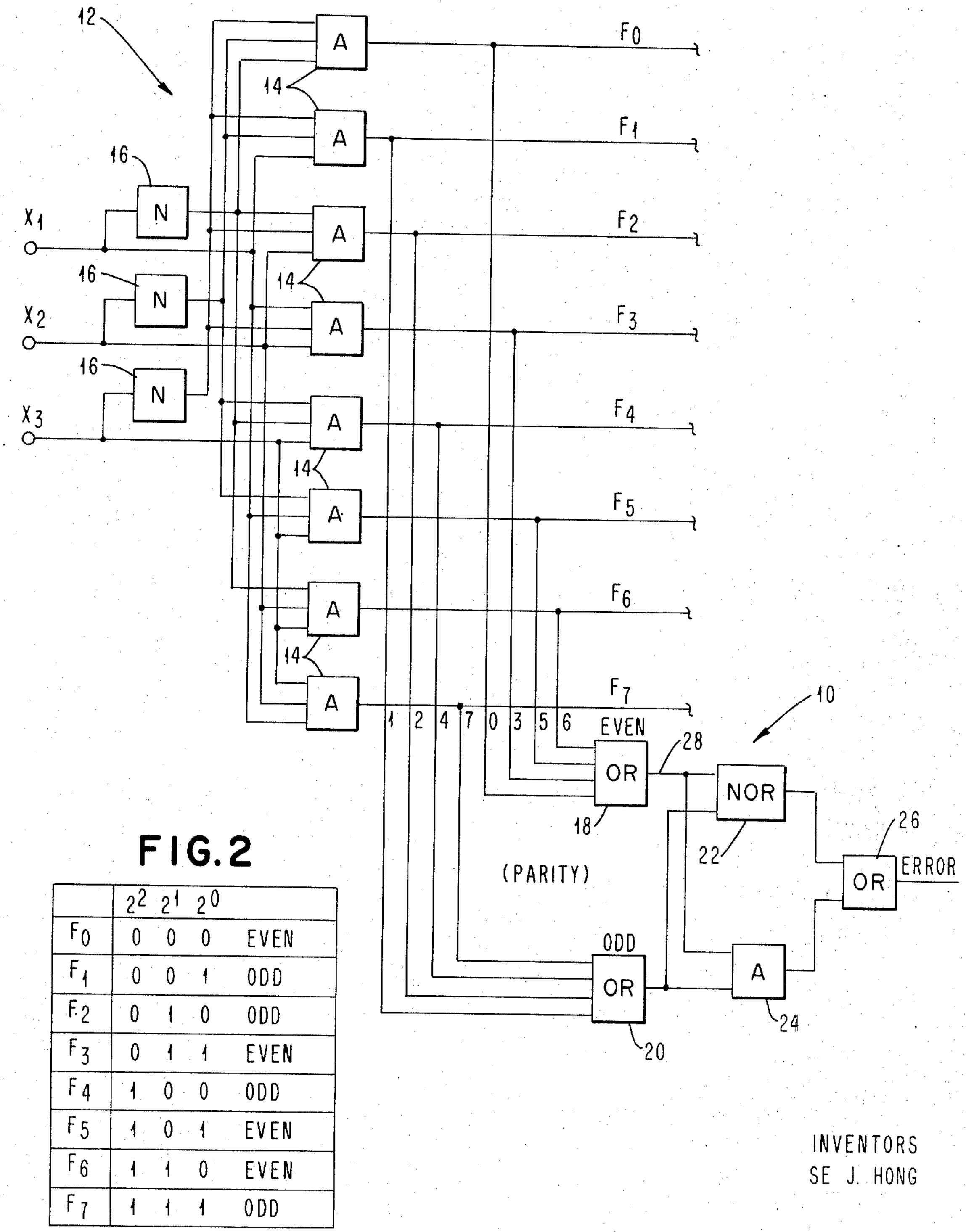
FIG. 1 is a schematic diagram of the error checking circuit shown connected to a 1 out of 8 decoder.
FIG. 2 is a table showing the binary designations for the decoder outputs and their parity.

Referring to FIG. 1, there is shown a detection circuit 10 connected to a decoder 12 of the type that can be checked by the error checking circuit of this invention. The decoder 12 is a logic network that accepts $n$ inputs and produces $2^n$ outputs. Each output representing a minterm of $n$ variables. The inputs Xi are fed directly to half of the output AND gates 14 in the decoder. Internally, the Xi inputs are branched through NOT gates 16 obtaining $\overline{X}$i signals which are fed to the other half of the AND gates 14. It will be appreciated that for each combination of inputs there is only one output. In the particular example shown, there are three inputs X1, X2 and X3 ($n = 3$), and eight outputs ($2^3 = 8$) designated as F0 through F7. Each of these outputs has a binary equivalent which is actually the binary representation of the input combination which will cause a signal at that output. Referring to the table in FIG. 2, the binary equivalents are shown for the outputs F0 – F7. Beside each of the binary representations, is given its parity designation. The parity designation being determined by the number of 1's appearing in the binary representation. An odd number of 1's providing an odd parity designation and an even number of 1's being designated as even parity. It should be noted that the outputs F0, F3, F5 and F6 are designated as having even parity. Returning to the mechanization of FIG. 1, each of the AND gate outputs represented by even parity (F0, F3, F5, F6) are connected to a first OR circuit 18 and each of the AND gate outputs represented by an odd parity (F1, F2, F4, F7) are connected to a second OR circuit 20. The dividing of the outputs of the decoder 12 into its odd and even parity group is very significant, and as will be seen later from an analysis of the errors which occur in the decoder, any single hardware error or failure will cause any additional line energization to be in the opposite parity group and hence energize the opposite OR circuit. It should be appreciated that this will allow all of the single hardware error failures to be detected by the connection scheme provided. The output of each of the first and second OR circuits 18,20 is fed in parallel as an input to a NOR circuit 22 and to an AND circuit 24. The output of the NOR circuit 22 and and AND circuit 24 are each connected as an input to a further OR circuit 26, which may be a Dot-OR connection, whose output, in the energized condition, indicates an error.

The operation of the checking circuit 10 can best be seen from an analysis of the various errors in the decoder 12 and their effect in the checking circuit. The first case to be considered is the no error condition in the decoder 12. The input signal combination will cause a particular AND circuit 14 output to be energized. Assuming that the parity designation of the particular AND circuit 14 is even, the first OR circuit 18 will accordingly produce an output on its output line 28. Since only one output is in the ON condition or energized during the operation of the decoder 12, all the other inputs to the even parity circuit 18 will be 0 and all the inputs to the odd parity OR circuit 20 will be 0. Accordingly, there should be no output from the second OR circuit 20. Therefore, the input to the NOR circuit 22 is an energized line from the even OR circuit 18 and an unenergized line from the odd OR circuit 20 or a 1 and a 0 input. In an ordinary OR circuit, this would result in a 1 output but since this is a NOR circuit, it results in a 0 output. Likewise, each output of the even and odd OR circuit 18,20 is connected to an AND circuit 24 where the input from the even OR circuit 18 is 1 and the input from the odd OR circuit 20 is 0. This results in no output from the AND circuit 24. Thus, the input to the further OR circuit 26 is 0 on both input lines resulting in no output from the further OR circuit 26 indicating that there is no error.

The second case to be considered is the output of the decoder 12 stuck at 0. This includes any single output line of the decoder or an AND gate stuck at 0, and any other internal failure that makes an output 0 when it should be 1. It will be appreciated that an at-least-1 check is sufficient to detect this type of error instantaneously. In other words, the output stuck at 0 will produce an all 0 output of the decoder 12 since the only line that should be energized is not energized and is hence, a 0 output. An all 0 input to the checking circuit 10 results in the NOR circuit 22 producing a 1 output which is an indication of an error when OR'ed in OR circuit 26 with the 0 output from the AND circuit 24.

The third situation which will be considered is the output of the decoder 12 stuck at 1. This includes any single output line or an AND gate stuck at 1 and any other internal failure that makes an output permanently 1. In order to check for this type of an error, an only-1 check is sufficient but costly. A pseudo only-1 check is obtained by the dividing of the outputs from the decoder 12 into two groups and inputting each group to a separate OR circuit. It can be immediately seen that the output of the AND circuit 24 will indicate an error condition or a 1 output, if the output of each OR circuit 18,20 is 1. This condition will exist only for an erroneous additional 1 output from the decoder 12. It is necessary for the output of the decoder 12 which is stuck at 1 to be inputted to the opposite OR circuit from the OR circuit which has the correct 1 input thereto resulting from the combinational input to the decoder. Hence, this is the only situation where an instantaneous detection is not guaranteed. There is a 50 percent chance that this type of error will be instantaneously detected and a 25 percent chance that the detection will occur one input after the occurence of the default, a 12½ percent chance for two input delayed detection and so on.

The fourth condition which is considered is the NOT gate 16 of the decoder being in error and similar errors. The first NOT gate 16 error to be considered is the feed-through-shorted NOT gate ($\bar{X}i = Xi$). In other words, the NOT gate 16 does not operate and the input thereto is fed directly through it without being inverted. Considering the Karnaugh map of the decoder of FIG. 1, the feed-through-shorted NOT gate produces migration of all Fk's in the $\bar{X}i$ side of the diagram to the Xi side:

| | X1 | | $\bar{X}$1 | |
|---|---|---|---|---|
| X2 | F6 | F7 | F3 | F2 |
| $\bar{X}$2 | F4 | F5 | F1 | F0 |
| | $\bar{X}$3 | X3 | | $\bar{X}$3 |

For example, F0 which is obtained by $\bar{X}$1, $\bar{X}$2, $\bar{X}$3 inputs would become F4 if the $\bar{X}$1 gate was shorted. It should be noted that in each case, the migration from the $\bar{X}$i to the Xi side in the map produces an output function which is of the opposite parity. For example, the binary equivalent of the F0 output has even parity, and the binary equivalent of the F4 output has odd parity. Thus, the combination of the first and second OR circuits 18,20 feeding the AND circuit 24 should give an instantaneous error indication for this condition. The $\bar{X}$i side of the diagram is checked by the output stuck at 0.

When the NOT gate 16 is stuck at 0, $X = 0$, all the Fk's in the Xi side of the diagram are deleted. The remaining side $\bar{X}$i is still checked by the output stuck at 0 provided by the NOR gate 22.

The last situation considered is where the NOT gate 16 is stuck at 1. $\bar{X}i = 1$. This results in duplication of all the Fk's in the $\bar{X}i$ side at the $Xi$ side.

The result of the above-noted migration and duplication is that when $Xi = 1$, the following two outputs become one at the same time:

$$(X1, X2, \ldots, Xi \ldots Xn) = Fk = 1 \text{ — original}$$
$$(X1, X2, \ldots, \bar{X}i \ldots Xn) = F'k = 1 \text{ — error}$$

This kind of error is detected by dividing the Fi's into their even and odd parity groups and inputting the even and odd parity groups to separate first and second OR circuits, the output of which when AND'ed together, produces practically instantaneously an error signal. It will be appreciated from the above analysis that Fk and F'k are always Hamming distance 1 apart. Thus, Fk and F'k will always appear in a different OR gate and contribute to the error practically instantaneously. It should be appreciated that exactly half of the outputs from the decoder 12 are even Hamming weight and the other half odd. Thus, the checking circuit 10 as shown in FIG. 1 is capable of detecting any single hardware failure in a decoder practically instantaneously with a minimum of hardware. Any size decoder can be checked with this same error checking circuit. The only increase will be in the number of inputs which will be connected to the first and second OR circuits 18,20.

While the invention has been particular shown and described with reference to a preferred embodiment thereof, it will be understood by those skilled in the art that various changes in form and detail may be made therein without departing from the spirit and scope of the invention.

What is claimed is:

1. A detection circuit for errors caused by a single hardware failure in a decoder having $n$ inputs and $2^n$ outputs comprising:

a first circuit having $2^n/2$ inputs and one output, each input connected to a respective one of the outputs of said decoder representing a binary number having the same parity;

a second circuit having $2^n/2$ inputs and one output, each input connected to a respective one of the outputs of said decoder representing a binary number having the same parity but opposite to the parity represented by the outputs of said decoder connected to said first circuit;

a logic circuit connected to the outputs of said first and second circuits for comparing the signals at said outputs of said first and second circuits to produce a single output signal indicating a failure in said decoder;

said first and second circuits producing an output signal when one or more inputs thereto are energized, respectively, an output signal on one of the outputs from said first and second circuits representing an error free operation of said decoder, while the absence of an output signal from both said first and second circuits represents one type of failure in said decoder and the presence of an output signal at an output of both said first and second circuits represents another type of failure in said decoder, the connecting of the inputs of the first and second circuits to outputs of said decoder representing opposite parities, respectively, insures that said another type of failure in said decoder causes an output signal from both said first and second circuits.

2. A detection circuit in accordance with claim 1, wherein said first and second circuits are OR circuits for producing an output signal when one or more of the inputs thereto are energized.

3. A detection circuit in accordance with claim 2, wherein said first OR circuit has its inputs connected to the half of the outputs of the decoder representing binary numbers having even parity and said second OR circuit has its inputs connected to the other half of the outputs of the decoder representing binary numbers having odd parity.

4. A detection circuit in accordance with claim 3, wherein said logic circuit comprises a NOR circuit having the output from each of said first and second OR circuits connected thereto as inputs and producing an output when the inputs thereto are both 0, and an AND circuit having the output from each of said first and second OR circuits connected thereto as inputs producing an output when the inputs thereto are both 1's and a third OR circuit having an input from both said NOR circuit and said AND circuit for producing an output representing any single fault condition in said decoder.

* * * * *